Sept. 19, 1961       R. W. GOODE       3,000,587
REEL WINDER

Filed May 26, 1958       6 Sheets-Sheet 1

INVENTOR.
Robert W. Goode
BY
Julian Caplan
attorney

Sept. 19, 1961

R. W. GOODE 3,000,587

REEL WINDER

Filed May 26, 1958

INVENTOR.
Robert W. Goode
BY
Julian Caplan
Attorney

INVENTOR.
Robert W. Goode

Sept. 19, 1961 R. W. GOODE 3,000,587
REEL WINDER
Filed May 26, 1958 6 Sheets-Sheet 4

INVENTOR.
Robert W. Goode
BY
Julian Caplan
Attorney

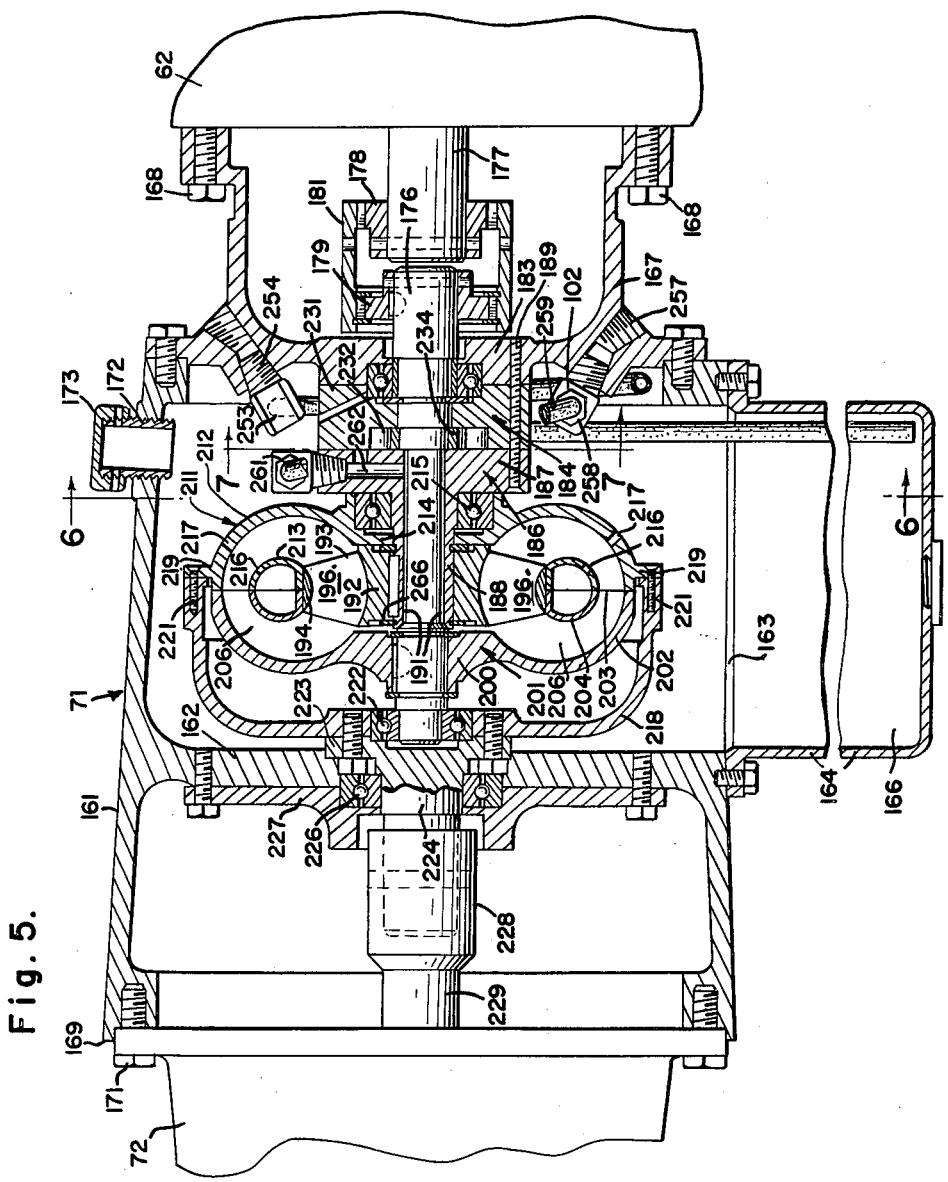

Sept. 19, 1961 R. W. GOODE 3,000,587
REEL WINDER
Filed May 26, 1958 6 Sheets-Sheet 6
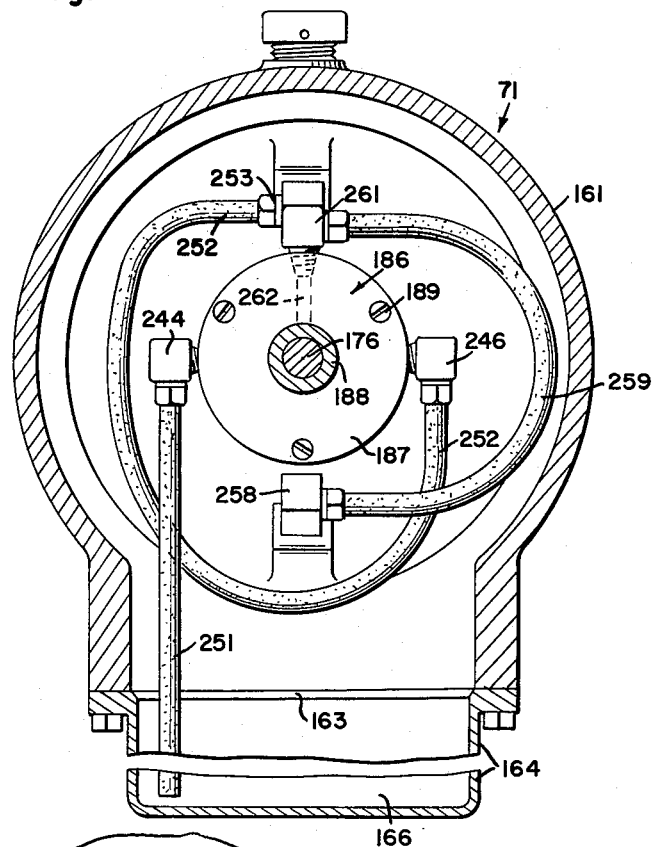
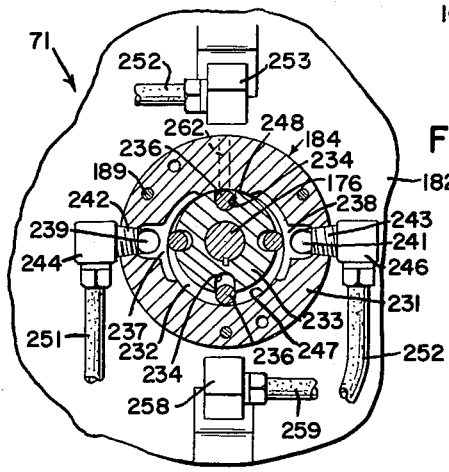
INVENTOR.
Robert W. Goode
BY
Julian Caplan
Attorney 3,000,587
REEL WINDER
Robert W. Goode, Morgan Hill, Calif., assignor to Gerald A. Petersen, Santa Clara, Calif.
Filed May 26, 1958, Ser. No. 737,948
3 Claims. (Cl. 242—86.5)

This invention relates to a new and improved trailer-type reel winder. A particular application of the device is in winding onto a reel a cable-pulling line during installation of a power line conductor, or an old conductor during re-conductoring.

One of the objects of the invention is to accommodate reels of a wide variety of diameters and, by a self-contained power unit, the reel may be raised from the ground for winding purposes and subsequently lowered to the ground after the reel is filled. Thus, the trailer may be used to load itself and to lift the reel through a wide range of elevations.

A further feature of the invention is the provision of hydraulic cylinders to raise and lower yoke arms supporting the reel. The arrangement is such that if one of the cylinders fails, or if the weight on one side of the reel is greater than on the other, the load of the yoke arms is supported by the opposite cylinder.

The invention provides a device either for pulling the wire in or braking the wire when being paid out.

Another feature of the arrangement of the device is the fact that it has a high stability inasmuch as, when it is being used to transport a reel from place to place, the reel may be carried low and, hence, the center of gravity is likewise low.

A further feature of the invention is its compactness, in that the entire unit is mounted on a trailer. The drive is so arranged that there are no exposed chains, sprockets or gears.

A particular advantage of the invention is the employment of a torque converter between a constant speed engine and the reel winding drive.

By incorporating the torque converter in the drive, the reel may be wound at full speed, any partial speed, or the reel may stand still or even reverse. Maximum torque is provided when required, i.e., at slow speeds or stall, thereby providing an ideal operating condition.

A still further feature of the invention is the provision of means for withdrawing fluid from the torque converter, passing the same through a heat exchanger and recirculating the fluid through the torque converter. The construction of the converter housing and the arrangement of the outlets and inlets of the circulating system comprise additional features of the invention. A small size converter is supplied which is adaptable to the particular operating conditions of the reel winder in that the converter is employed in order to operate under stall conditions rather than in order to obtain maximum efficiency.

Other objects of the present invention will become apparent upon reading the following specification and referring to the accompanying drawings in which similar characters of reference represent corresponding parts in each of the several views.

In the drawings:

FIG. 5 is a longitudinal sectional view through the torque converter taken substantially along line 5—5 of FIG. 2

FIG. 6 is a sectional view taken substantially along line 6—6 of FIG. 5.

FIG. 7 is a sectional view taken substantially along line 7—7 of FIG. 5.

Figure 1:
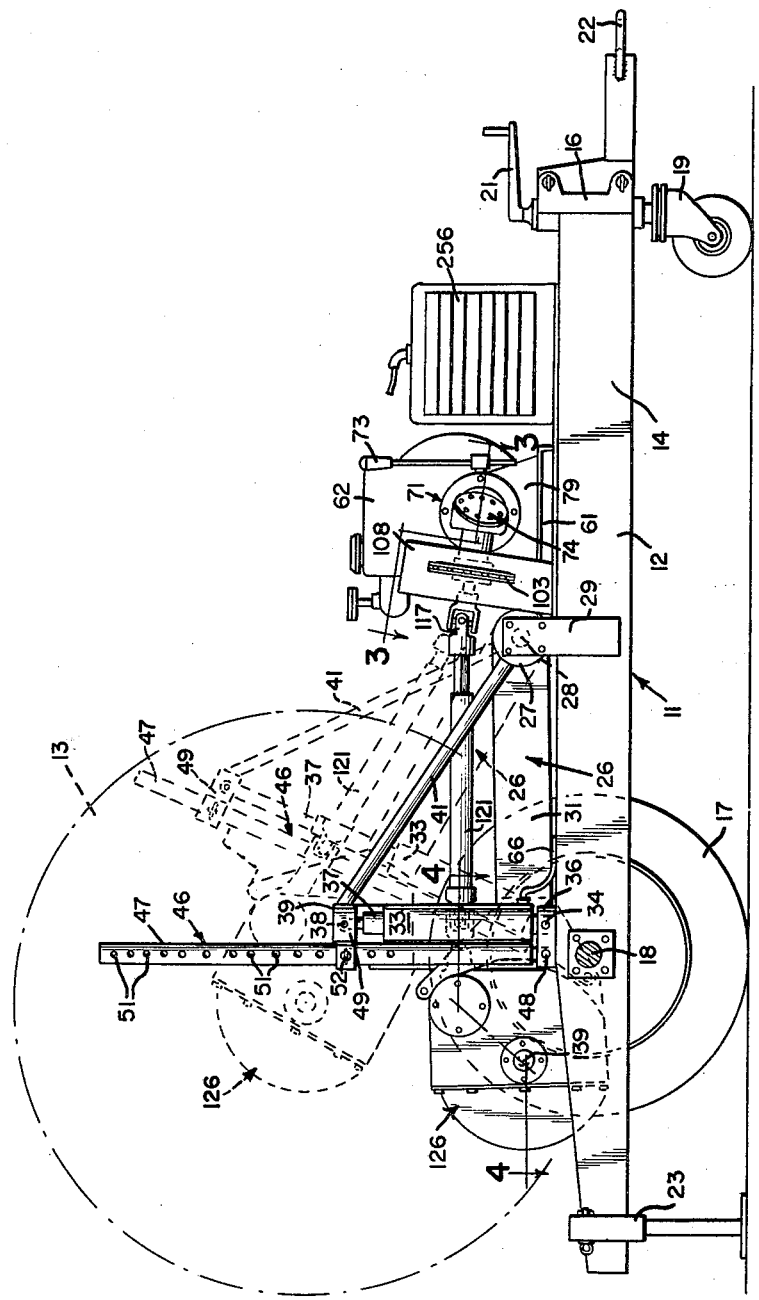
FIG. 1 is a side elevation of the device showing, in dot and dash lines, a reel in elevated position and, in solid lines, the loading position of the device.
Figure 2:
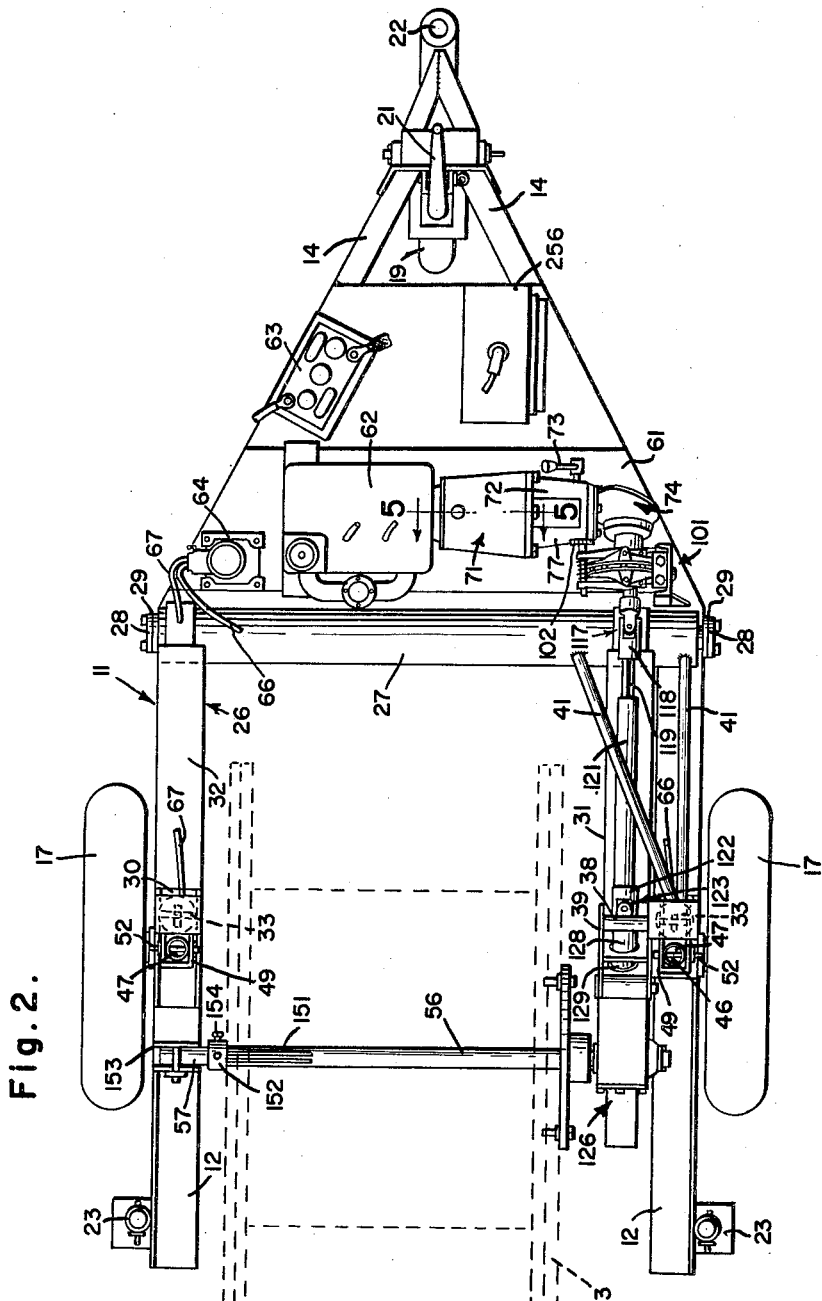
FIG. 2 is a top plan of the construction of FIG. 1.

The present invention is trailer-mounted in that there is provided a trailer 11 having a frame made up of side members 12 spaced apart a distance greater than the maximum width of a reel 13 to be wound. At the forward end of the side members 12 are inwardly forwardly converging frame extensions 14 interconnected by end member 16. Wheels 17 mounted on stub axles 18, supported by the side members 12, are located on either side. At the forward end is a caster 19 which is adjusted in height by means of crank 21. Caster 19 is retractable, as is well understood in the art. For towing purposes, a towing eye 22 is connected to the front of the trailer. At the rear, on either side, is a vertically adjustable support stand 23.

The reel 13 is raised and lowered by means of a yoke 26 and associated mechanism. The yoke comprises a central transverse hollow tubular shaft 27 which is rotatively mounted on the trailer by means of bearings 28 on the upper ends of legs 29 extending upwardly from the side frame members 12, adjacent the juncture of the forward ends of the side members 12 and the converging extensions 14. On either side of the central member are arms 31, 32 fabricated of a formed shape and welded at their inner ends to transverse shaft 27. On either side of the trailer is a telescopic hydraulic cylinder 33, the lower end of which is pivotally mounted by means of pin 34 to a bracket 36 on the trailer frame side member 12. The piston 37 which reciprocates in cylinder 33 is pivotally mounted at its outer end by means of pin 38 to the bracket 39 fastened to the top surface of arm 31. Arm 32 is apertured, as indicated by reference numeral 30 to provide clearance for its cylinder 33. On the right side of the trailer a pair of rearwardly converging support rods 41 is fastened at their rearward ends to bracket 39, and at their forward ends to transverse shaft 27. Rods 41 prevent lateral displacement of the outer end of yoke 26. An auxiliary support 46 is provided at either side of the trailer consisting of a tube 47 pivoted by means of pin 48 at its lower end to bracket 36 on side frame member 12 and received at its upper end in clevis 49 attached to bracket 39. Tube 47 is provided with a series of longitudinally spaced holes 51 and clevis 49 is provided with a removable clevis pin 52 so that once the reel support has been adjusted to the proper elevation, pin 52 can be inserted in the corresponding hole 51 to prevent dislodgment of the reel from its proper position in the event of failure of hydraulic cylinder 33. The outer, rearward ends of arms 31, 32 provide a mounting means for the ends of transverse reel shaft sections 56, 57 which support and rotate the reel 13, all as hereinafter explained in greater detail.

Mounted forwardly of transverse shaft 27 is a platform 61 which carries the drive members of the reel winder. The prime mover consists of a gasoline-driven engine 62 of conventional construction which operates at substantially constant speed. A generator (not shown) is driven by engine 62 and connected to storage battery 63. An electrically or mechanically-driven pump 64 is mounted on platform and is energized either by the generator or battery 63 or by a mechanical drive (not shown) from engine 62. Pump 64 is connected by means of hoses 66, 67 to hydraulic cylinders 33, to raise the ends of reel support 26.

The drive shaft of engine 62 is connected to the input shaft of torque converter 71, hereinafter described in greater detail. The function of torque converter 71 is to enable the engine 62 to operate at substantially constant speed and yet permit the reel 13 to wind at varying speed, depending upon operating conditions. Immediately beyond the torque converter 71 there may be installed a conventional, commercially available reversing gear 72 controlled by handle 73 which may be used to reverse the direction of rotation of the reel winder, if desired.

Figure 3:
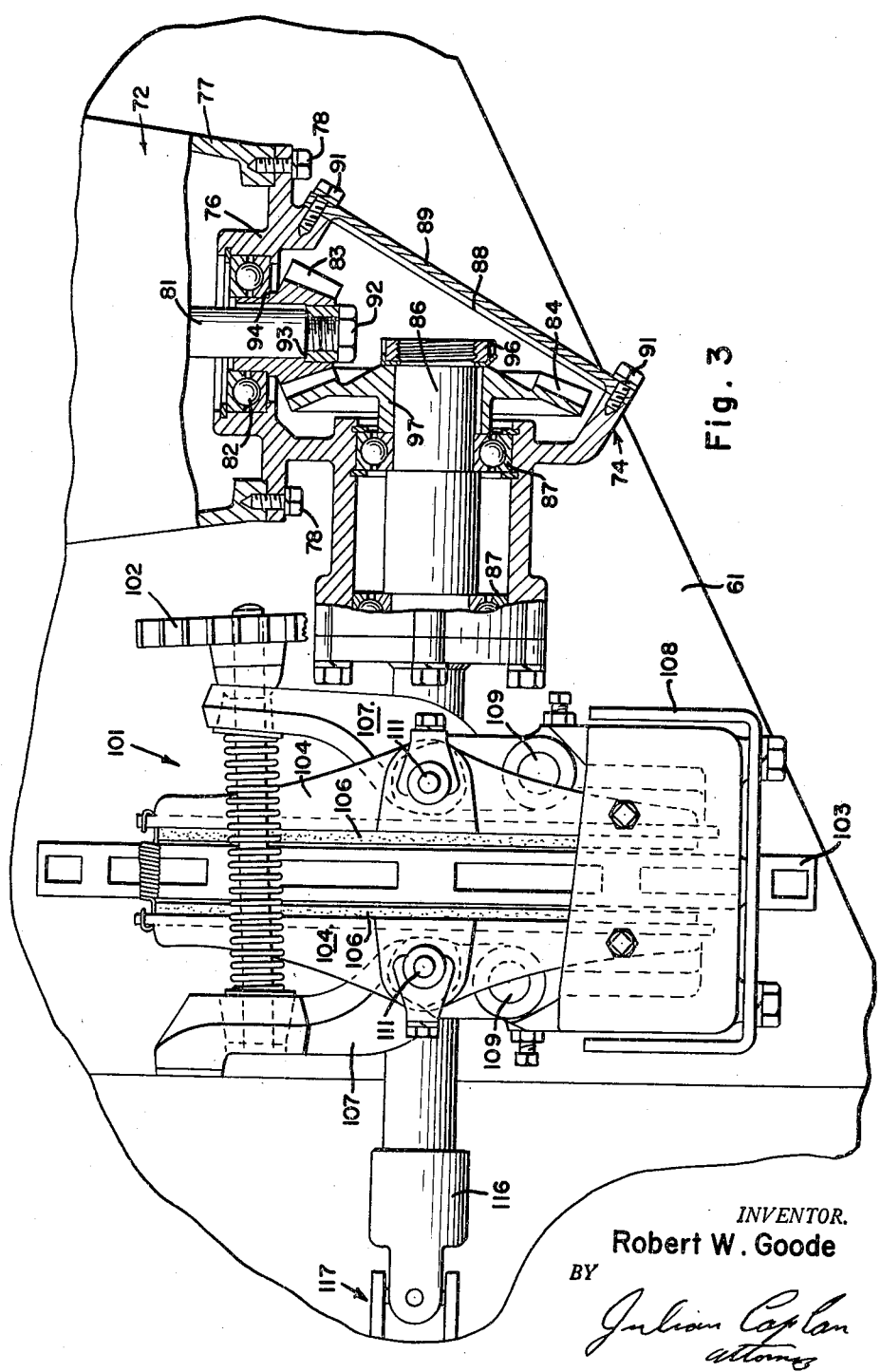
FIG. 3 is an enlarged fragmentary sectional view taken substantially along line 3—3 of FIG. 1.
Figure 4:
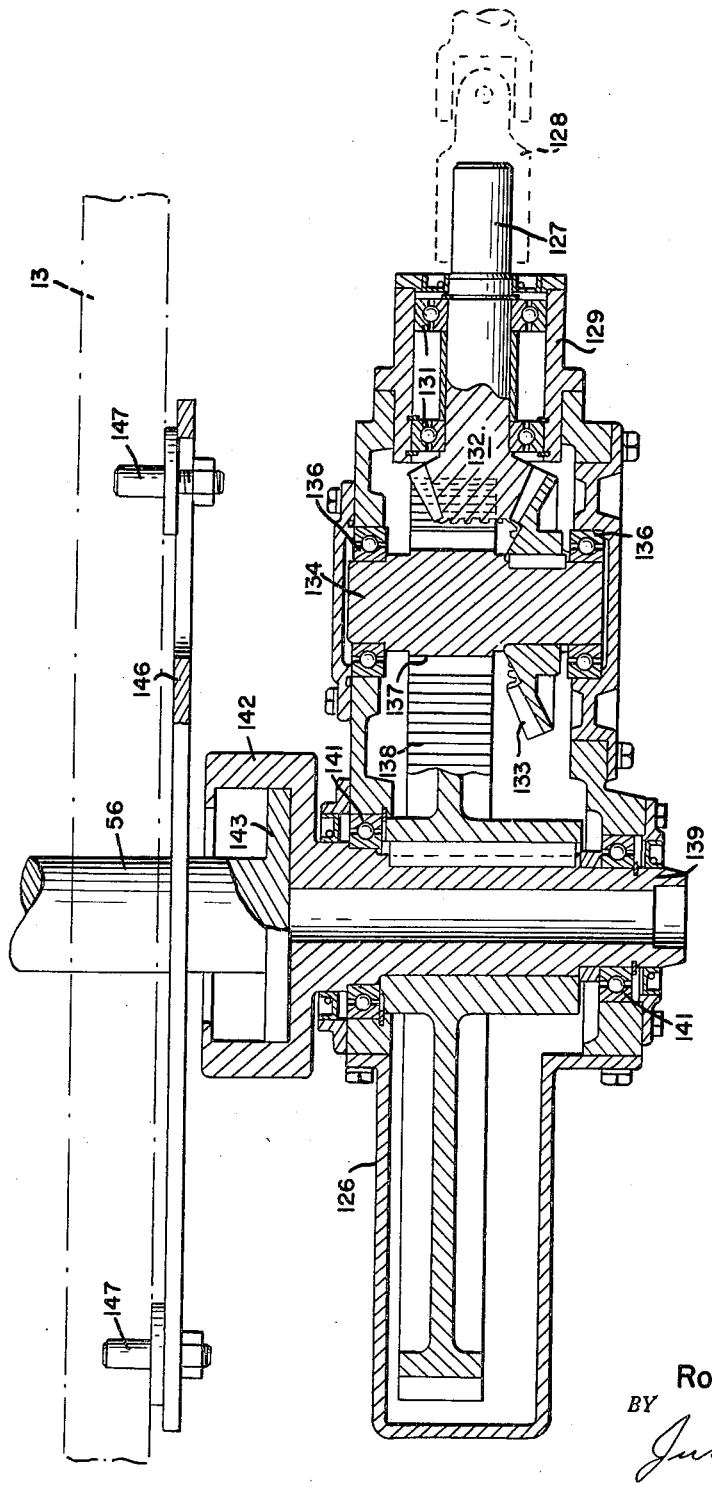
FIG. 4 is an enlarged fragmentary sectional view taken substantially along line 4—4 of FIG. 1.

A right angle gear 74 is positioned at the right-hand side of the trailer and connected to reversing gear 72. Right angle gear 74, as shown in detail in FIG. 3, consists of a housing 76 fastened by bolts 78 to the housing 77 of the reversing gear which is, in turn, secured to a vertical plate 79 projecting upwardly from platform 61. Shaft 81, which is the driven shaft of the reversing gear 72, is suitably journaled in housing 76 by means of bearings 82. The inner end of shaft 81 carries a pinion bevel gear 83 which meshes with a bevel gear 84 on the inner end of driven shaft 86 disposed at a 90° angle with respect to shaft 81. Driven shaft 86 is likewise mounted in housing 76 by means of bearings 87. To provide access to the interior of housing 76, the housing is parted along plane 88 at a 45° angle, the opening thus provided normally being closed by a cover plate 89 held in position by means of screws 91. Each of shafts 81 and 86 is threaded at its inner end. Pinion 83 is counter-bored and nut 92 threaded on the end of shaft 81 engages the internal shoulder 93 on pinion 83. The external shoulder 94 on pinion 83 bears against bearing 82 and, hence, pinion-bevel gear 83 is held in place. Bevel gear 84 is held on the end of shaft 86 by means of nut 96, the hub 97 on gear 84 bearing against bearing 87 and, hence, by tightening nut 96, gear 84 is held in place.

Immediately beyond right-angle gear 74 is a manually-controlled brake 101 of conventional design and having a knob 102 which may be turned to lock the shaft 86 in position when desired. Brake 101 consists of an air-cooled ventilated disc 103 rotatable with shaft 86 and a pair of shoes 104 lined with brake-lining 106 on opposite sides of the disc. When knob 102 is turned, the shoes 104 are brought toward disc 103 by means of brake arms 107 which are pivoted to a stationary support extension 108 of platform 61 by means of pivot pins 109 and which move inwardly brake pins 111 carried by shoes 104.

Shaft 86 is connected to one of the inter-fitting members 116 of universal joint 117. The opposite member 118 of universal joint 117 is fixed to one end of square telescopic shaft 119 which extends up arm 31. Shaft 119 slides in sleeve 121 in telescopic fashion and the opposite end of sleeve 121 is fixed to one member 112 of second universal joint 123. The telescopic shaft 119—121 accommodates the raising and lowering of the yoke support 26 and the problem of different pivot axes of support 26 and universal joint 117.

Mounted on the outer end of right-hand support arm 31 is gear box housing 126. Shaft 127 connected to member 128 of universal joint 123 extends through a boss 129 in housing 126 and is suitably journaled therein by bearings 131. The inner end of shaft 127 carries a pinion-bevel gear 132 which meshes with bevel gear 133 on stub shaft 134 extending transversely of housing 126 and journaled therein by bearings 136. Stub shaft 134 likewise carries a pinion-spur gear 137 which meshes with a large diameter spur gear 138 keyed to drive shaft 139 journaled in housing 126 by bearings 141 and axially aligned with reel shaft portion 56. Drive shaft 139 extends out through the housing 126 and carries on its outer end reel drive hub 142 which engages and turns hub 143 on transverse reel spindle section 56. Spindle 56 also carries and rotates plate 146 having a pair of pins 147 which fit inside the conventional holes in the side of the reel 13 to accomplish winding, as is well understood in this art. The right-hand end of spindle 56 receives collar 152. Set screws 154 carried by collar 152 may be used to lock or unlock parts 56 and 57 when it is desired to install or remove a reel and adjust so as to engage the side of the reel 13 during winding to prevent lateral movement.

It will thus be seen that the power from the engine 62 is transmitted to spindle 56 so that the reel 13 may be wound in either direction as operating conditions of the cable installation required. The speed of winding is in no way dependent upon the speed of operation of the engine by reason of the interposition of the torque converter 71 in the drive line. The torque converter 71 will be next described.

Various hydraulic and electric torque converters may be employed. That herein described and illustrated in the drawings is one of several satisfactory types. Torque converter 71 is contained in a generally cylindrical housing 161 having a vertical partition 162 intermediate its open ends. The bottom of the housing 161 is cut away in an opening 163 which is closed off by an oil pan 164 to provide a sump 166 for hydraulic fluid. The open end of housing 161 adjacent engine 62 is closed off by an adapter ring 167 attached to engine 62 by bolts 168. The opposite open end 169 of housing 161 is connected to reversing gear box 72 by bolts 171. A nipple 172 closed by a vented cap 173 provides access for replacement of fluid.

The right-hand end of input shaft 176 which as viewed in FIG. 5 is connected to the drive shaft 177 of engine 62 by means of a connector, having three parts, namely, a first externally splined member 178 keyed to engine drive shaft 177, a second externally splined member 179 keyed to input shaft 176, and an outer internally splined member 181 meshing with members 178 and 179, so that input shaft 176 turns with engine shaft 177.

End 182 of adapter ring 167 has a hub 183 to which is fastened pump body 184, hereinafter described in greater detail, and immediately to the left of pump body 184 is reaction member support 186, which consists of a hub 187 and an elongated tubular nose 188 surrounding shaft 176. Screws 189 fasten parts 183, 184 and 186 together. An annular passageway 191 extends between nose 188 and shaft 176 for a purpose which hereafter appears. The left end of nose 188 is keyed to the inner hub 192 of a non-free-wheeling reaction member 193, having an outer annular ring 194 and a plurality of turbine-shaped blades 196 interposed between ring 194 and hub 192, the precise shape of blades 196 not being illustrated in detail as it is well understood in this art and forms no part of the present invention. Immediately beyond reaction member 193 and keyed to the outer end of shaft 176 is the hub 200 of non-free-wheeling converter pump 201 which has a substantially hemispherical toroidal shell 202 parted along a vertical line 203 and carries a smaller hemispherical toroidal ring 204, the rings 202 and 204 being inter-connected by pump blades 206 of a shape well understood in this art and forming no part of the present invention. To the right of pump 201 is a complementary turbine member 211, likewise having hemispherical toroidal outer shell 212 and inner ring 213 merging with rings 202 and 204, respectively. Turbine member 211 has a central hub 214 supported by nose 188 of support member 186 and by bearing 215 interposed between the hub 214 and nose 188. Shell 212 and ring 213 are formed with a plurality of vents 216 and 217, respectively, to bleed air to prevent cavitation and to discharge hydraulic fluid. A large diameter cup-shaped converter cover 218 is connected to a peripheral flange 219 on turbine 211 by means of bolts 221. The center of cover 218 is apertured to receive bearing 222 interposed between cover 218 and the left-hand end of input shaft 176. Surrounding bearing 222 is annular flange 223 of driven shaft 224 which is supported by bearing 226 interposed between driven shaft 224 and partition 162 and bearing seal 227 fastened to partition 162. The end of driven shaft 224 is fastened to the enlarged end 228 of reverse gear input shaft 229.

Pump 184 consists of a housing 231 having a central cavity 232 in which revolves a pump rotor 233 keyed to shaft 176. Rotor 233 is in the shape of a flat disc having four arcuate grooves 234, spaced 90° apart in its periphery. Each groove 234 is provided with a cylindrical roller 236 which functions as a pump vane. On opposite sides of the pump cavity 232 are inlet and discharge ports 237 and 238, respectively, which comprise outwardly extending recesses communicating with longitudinal passageways 239 and 241, which, in turn, communicate with the inner ends of threaded holes 242 and 243. Fittings 244 and 246 are attached to the outer ends of holes 242 and 243. The lower surface 247 of pump cavity, as viewed in FIG. 7, is arcuate, and the upper surface 248 of the recess is raised. The center of curvature of surface 248 lies on the axis of shaft 176 whereas the center of curvature of surface 247 is eccentric. Thus, as the shaft 176 rotates in a counter clockwise direction, as viewed in FIG. 7, each roller 236 as it passes the raised portion 248 is retracted. Centrifugal force tends to move each roller outwardly in its groove 234 so that the roller tends to be in tangential contact with the wall of pump cavity 232. The rotor 233 revolves in a counterclockwise direction, as viewed in FIG. 7, and, hence, the rollers tend to move fluid from the inlet port 237 on the left side of FIG. 7, around the bottom of the pump cavity, and discharge the fluid at the discharge or right-hand port 238.

From the sump 166 the fluid is drawn up through tube 251 and fitting 244 to the intake port 237 and is discharged from the outlet port 238 and fitting 246 through tube 252 which runs around the inside of casing 161 and is connected by fitting 253 to opening 254 in adapter ring 167 and thence by a pipe (not shown) to heat exchanger 256. The return from the heat exchanger 256 extends through hole 257 in adapter ring 167, fitting 258, hose 259, fitting 261 and, thence, through radial hole 262 in the hub 187 of the reaction member support 186. There is an annular space 191 between the inside diameter of the nose 188 of the reaction member support and the outside diameter of the shaft 176. Hence, the fluid flows in an axial direction out the end of the nose 188 and into recess 266. Thence, the fluid passes into the vanes 206 of the pump torus 202 and around the turbine torus 212 and through the reaction member 192 and, thence back to the pump 201. The vents 217 in the torus 212 of the turbine member are primarily to bleed air and prevent cavitation, but also to permit discharge of fluid which then returns to the sump 166.

In operation the trailer 11 is maneuvered adjacent a reel 13. Pump 64 is driven to energize cylinders 33 so that the spindle 56 is at the proper elevation for loading the reel, the device accommodating reels of a wide range of diameters. Spindle 56 is inserted through the hole in the reel in conventional manner. Thereupon, pump 64 is driven to raise the reel a sufficient distance above the ground for the purpose intended. The auxiliary supports 46 are then adjusted by pins 52 at proper elevation to hold the reel in place even through pump 64 should fail. If the device is to be used at a remote site, the trailer 11 may be towed by any conventional means. The center of gravity may be maintained low, thus affording a considerable advantage, particularly in rough terrain. Upon arrival at the site, the reel 13 may be adjusted to proper elevation, if necessary, by pump 64 and cylinders 33.

The reel winder is now ready for use and the engine 62 is started and driven at constant speed. Reversing gear 72 is adjusted for proper direction of winding. Brake 101 is released. The torque converter 71 enables the spindle 56 to revolve at any required speed or to stall, depending upon operating conditions. The maximum torque is delivered at stall or at slow speed, which is the optimum operating condition. When winding of the reel is temporarily discontinued for any reason, brake 101 may be engaged, but during temporary stoppage the converter 71 functions in a manner to hold the cable stationary and taut.

Although the foregoing invention has been described in some detail by way of illustration and example for purposes of clarity of understanding, it is understood that certain changes and modifications may be practiced within the spirit of the invention and scope of the appended claims.

I claim:
1. In a reel winder, a trailer frame disposed parallel to and in proximity to the ground, wheels supporting said frame above the ground, said frame having divergent sides and a transversely extending first end and being open at the end opposite said first end, said frame being open and unobstructed between said sides and to the ground, a horizontal transverse shaft at said first end, means mounting said shaft on said frame in proximity to the ground for oscillatory movement, reel support arms fixed to said transverse shaft projecting toward the open end of said trailer, a cylinder connected at one end to said frame adjacent the outer end of one of said support arms and a piston in said cylinder connected to said support arm, said cylinder being substantially vertical, means for energizing said cylinder, a transverse horizontal spindle on the outer ends of said arms to support and rotate a reel, a prime mover on said first end of said frame, a torque converter connected to said prime mover and driven thereby, a power train from said torque converter and pivotally mounted on said frame about an axis spaced toward said first end relative to said shaft, said power train comprising a first shaft connected to said torque converter, a right angle gear drive connected to said first shaft, a first universal joint connected to said right angle gear drive, a telescope shaft connected to said first universal joint and extending to the outer end of one of said support arms, a second universal joint connected to said telescopic shaft, and means for driving said spindle from said second universal joint, said first universal joint being located eccentric relative to said transverse shaft.

2. A reel winder according to claim 1, in which said means for energizing said cylinder comprises a pump driven by said prime mover.

3. A reel winder according to claim 1, which further comprises an auxiliary support interconnecting said frame and one of said support arms adjacent and parallel to said cylinder and means for adjustably securing said auxiliary support in a plurality of positions of adjustment.

References Cited in the file of this patent
UNITED STATES PATENTS

| | | |
|---|---|---|
| 450,030 | Miller | Apr. 7, 1891 |
| 1,684,606 | Thielen | Sept. 18, 1928 |
| 1,939,055 | Johnson | Dec. 12, 1933 |
| 1,949,481 | Koller | Mar. 6, 1934 |
| 2,266,446 | Sluyter | Dec. 16, 1941 |
| 2,469,004 | Rosebrough | May 3, 1949 |
| 2,624,522 | Van Hook | Jan. 6, 1953 |
| 2,630,930 | Ulrich | Mar. 10, 1953 |
| 2,759,682 | Garnett | Aug. 21, 1956 |
| 2,828,089 | Isenberger | Mar. 25, 1958 |
| 2,839,257 | Chicane | June 17, 1958 |

FOREIGN PATENTS

| | | |
|---|---|---|
| 290,475 | Switzerland | Aug. 1, 1953 |